United States Patent
Yamasaki

(10) Patent No.: US 8,139,435 B2
(45) Date of Patent: Mar. 20, 2012

(54) DATA STORAGE APPARATUS AND CONTROL METHOD OF DATA STORAGE APPARATUS

(75) Inventor: Shozo Yamasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 12/722,893

(22) Filed: Mar. 12, 2010

(65) Prior Publication Data
US 2010/0232247 A1   Sep. 16, 2010

(30) Foreign Application Priority Data

Mar. 16, 2009   (JP) ................................. 2009-063202

(51) Int. Cl.
*G11C 5/14* (2006.01)
*G11C 7/00* (2006.01)
(52) U.S. Cl. ......................... 365/226; 365/222; 365/149
(58) Field of Classification Search .................. 365/226, 365/222, 149
See application file for complete search history.

(56) References Cited

U.S. PATENT DOCUMENTS

| 5,365,487 A | * | 11/1994 | Patel et al. ..................... 365/226 |
| 6,256,252 B1 | * | 7/2001 | Arimoto ........................ 365/227 |
| 7,085,152 B2 | * | 8/2006 | Ellis et al. ..................... 365/149 |
| 2008/0279017 A1 | * | 11/2008 | Shimano et al. ......... 365/189.06 |

FOREIGN PATENT DOCUMENTS

| CN | 101251729 A | 8/2008 |
| JP | 2006-331305 A | 12/2006 |
| JP | 2006-331305 A | 12/2006 |

OTHER PUBLICATIONS

Chinese Office Action for Appln. No. 201010132264.4 dated Oct. 14, 2011.

* cited by examiner

*Primary Examiner* — Anh Phung
(74) *Attorney, Agent, or Firm* — Carter, DeLuca, Farrell & Schmidt LLP

(57) ABSTRACT

In a data storage apparatus having data storage means, if it is judged that a condition of transitioning the data storage apparatus into a power saving state is established, it is controlled so that states of signals to be output by operation control means of controlling an operation of the data storage means to plural signal lines are fixed to a specific signal state, and supply of a reference voltage by reference voltage supply means to the plural signal lines is stopped.

18 Claims, 7 Drawing Sheets

DATA STORAGE APPARATUS AND CONTROL METHOD OF DATA STORAGE APPARATUS

BACKGROUND OF THE INVENTION

1. Field of the Invention

The present invention relates to a data storage apparatus and a control method of the data storage apparatus.

2. Description of the Related Art

In a system which includes a memory (for example, a DRAM (Dynamic Random Access Memory)) acting as a data storage unit for storing data, a use of a memory power saving function has been conventionally adopted as a method of reducing power consumption of the system. Here, it should be noted that the power saving function of the memory is the function to transition the memory into a power saving state such as a power down state or a self refresh state.

In order to make the power saving function further effectual, Japanese Patent Application Laid-Open No. 2006-331305 discloses an interruption control unit which transitions a DDR SDRAM (Double-Data-Rate Synchronous Dynamic Random Access Memory) into a power saving state and then interrupts the terminal power supply of the DDR SDRAM. Here, as a terminal circuit of the DDR SDRAM, an SSTL2 (Stub Series Terminated Logic for 2.5V) interface based on JEDEC (Joint Electron Devices Engineering Council) standards has been known.

In the terminal circuit which is compliant with SSTL2, an intermediate voltage (e.g., 1.25V) of a power supply voltage (e.g., 2.5V) of a memory system is supplied to each of plural signal line through a terminal resistor. Consequently, even if the DDR SDRAM is transitioned into the power saving state, currents can flow from the power supply for supplying the intermediate voltage to the plural signal lines, whereby power consumption according to such current flowing resultingly occurs in the terminal circuit.

Further, the transition of the DDR SDRAM into a power down mode is performed by transitioning a CKE signal of the interface into a LOW level after all memory banks of the DDR SDRAM entered an idling state. If the state is transitioned into the power saving state by changing over the signal level of only the CKE signal at the idling state, HIGH and LOW signals levels respectively exist in the interface. Therefore, if the terminal power supply is interrupted as it is, the current flows from the HIGH level signal to the LOW level signal through the terminal circuit, whereby power consumption according to the current flowing occurs.

In Japanese Patent Application Laid-Open No. 2006-331305, two interruption units for the terminal power supply are provided in order to solve such a problem as described above. That is, the HIGH level signal and the LOW level signal are controlled respectively by the independent interruption units to restrain the current from flowing when the terminal power supply is interrupted, thereby reducing the power consumption in the terminal circuit.

However, in such a method as disclosed in Japanese Patent Application Laid-Open No. 2006-331305, since the two interruption units are provided for the terminal power supply, power is still consumed in these interruption units. Thus, the power consumption increases at a time of an ordinary operation in which the memory is not transitioned into the power saving state.

SUMMARY OF THE INVENTION

The present invention has been completed in consideration of the above-described related art, and aims to provide an improved data storage apparatus and a control method of the improved data storage apparatus.

Further, the present invention aims to provide a mechanism for achieving reduction of power consumption in a data storage apparatus.

According to an aspect of the present invention, a data storage apparatus, which includes a data storage unit configured to store data, comprises: an operation control unit configured to control an operation of the data storage unit so as to transmit/receive the data to/from the data storage unit, through a bus including plural signal lines; a judgment unit configured to judge whether or not a condition of transitioning the data storage apparatus into a power saving state is established; a reference voltage supply unit configured to supply a reference voltage to the plural signal lines; and a power control unit configured to, in a case where it is judged by the judgment unit that the condition of transitioning the data storage apparatus into the power saving state is established, fix states of signals to be output by the operation control unit to the plural signal lines to a specific signal state and control to stop the supply of the reference voltage by the reference voltage supply unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

DESCRIPTION OF THE EMBODIMENTS

Figure 1:
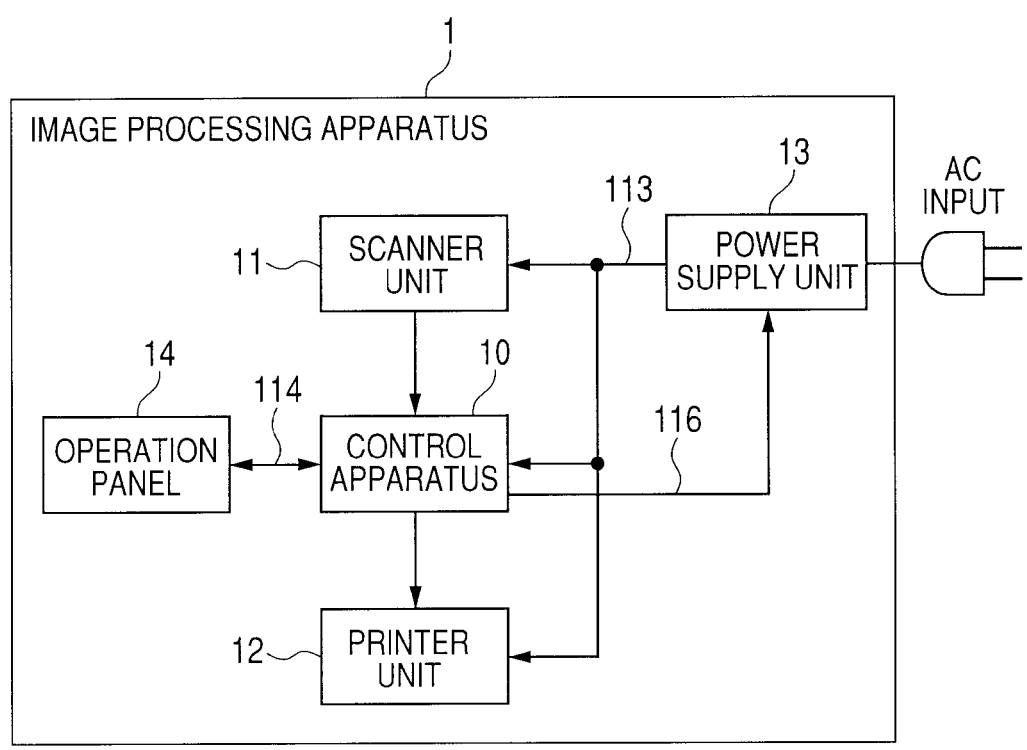
FIG. 1 is a block diagram illustrating an image processing apparatus to which a data storage apparatus according to the present invention is applicable.

The present invention will now be described in detail with reference to the attached drawings showing various exemplary embodiments thereof. In the drawings, elements and parts which are identical throughout the views are designated by identical reference numerals, and duplicate description thereof is omitted.

First Embodiment

Hereinafter, the best mode for carrying out the present invention will be described with reference to the attached drawings.

FIG. 1 is a block diagram illustrating an image processing apparatus to which a data storage apparatus according to the present invention is applicable.

FIG. 1 illustrates an image processing apparatus to which the data storage apparatus according to the present invention is applicable. In FIG. 1, a control apparatus 10 controls the image processing apparatus 1 overall. Further, the control apparatus 10 performs an image process and the line based on image data received from a scanner unit 11, a host computer being an external apparatus, a facsimile machine connected through a PSTN (Public Switched Telephone Networks) line (i.e., a public line) or the like, and forms an image obtained by the image process on, e.g., a recording paper through a printer unit 12.

The scanner unit 11 reads an original as image data, and transmits the read image data to the control apparatus 10. Although it is not illustrated, the scanner unit 11 includes a scanner which has a function of reading the original and an original document feeder which has a function of feeding and transporting original documents.

The printer unit 12 transports a recording paper, prints the image data received from the control apparatus on the recording paper as a visible image in an electrophotography method, and discharges the recording paper on which the visible image has been printed. Although it is not illustrated, the printer unit 12 includes a paper feeding unit which has plural kinds of recording paper cassettes, a marking unit which has a function of transferring the image data to the recording paper and fixing the transferred image data, and a paper discharging unit which has a function of sorting and stapling the recording papers on which the images have been printed respectively and outputting the processed recording papers outward the apparatus.

A power supply unit 13 is the power supply circuit which uses an alternating current commercial power supply (i.e., an AC power supply) as an input source. More specifically, the power supply unit 13 generates a voltage 113 for supplying a DC voltage and/or an AC voltage to the control apparatus 10, the scanner unit 11 and the printer unit 12. Further, the power supply unit 13 changes the voltage level of the DC voltage according to a supply signal 116 from the control apparatus 10.

An operation panel 14 is used to perform various settings for causing the printer unit 12 to perform image formation based on the original read by the scanner unit 11, in response to an instruction from an operator (i.e., a user). For example, the operation panel 14 is used to input the number of copies to be image formed, information concerning density for the image formation, and selection of reading resolution (e.g., 300 dpi, 600 dpi, etc.) of the scanner unit for reading the original.

Figure 2:
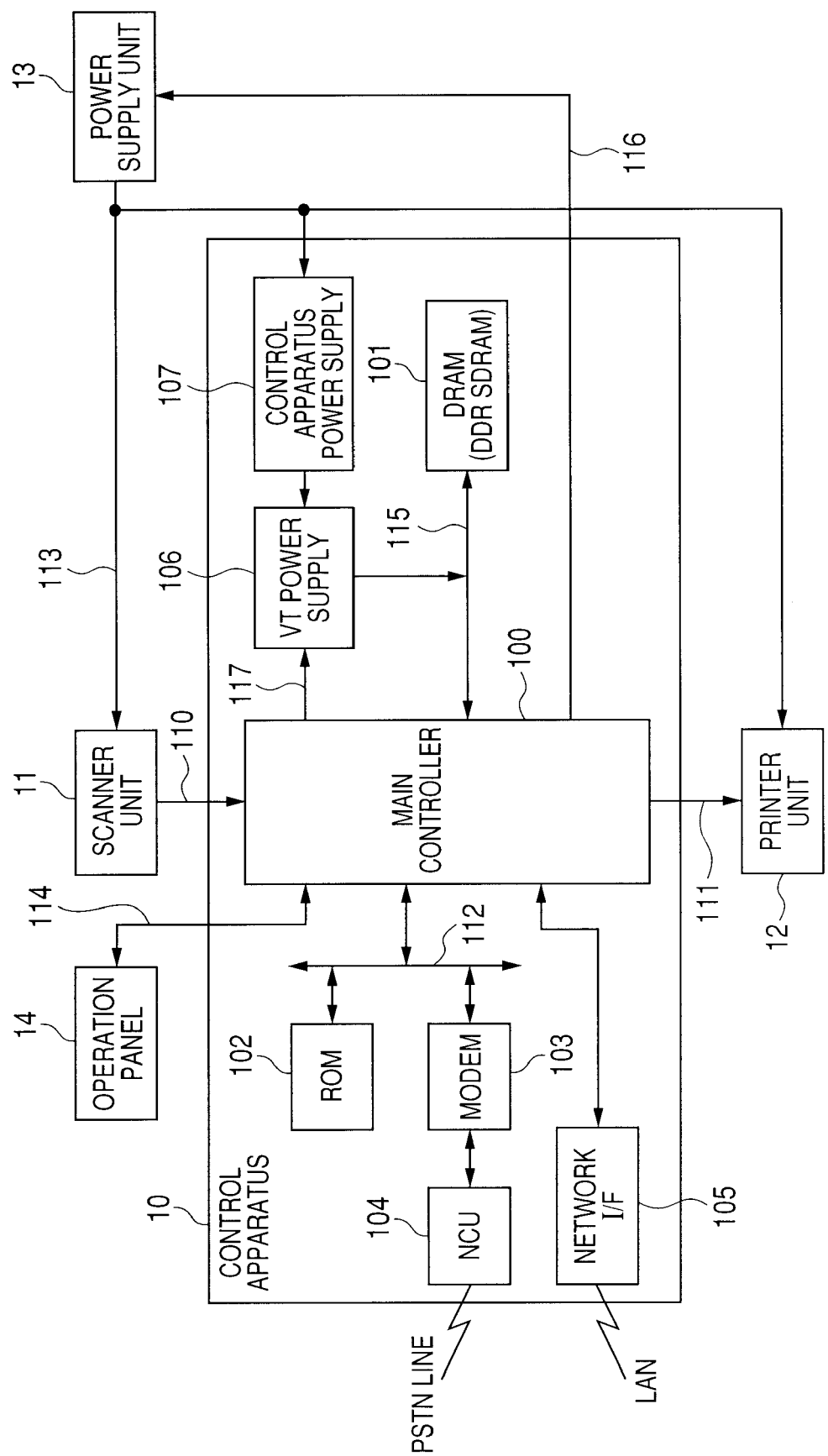
FIG. 2 is a block diagram illustrating the constitution of a control apparatus 10.

FIG. 2 is a block diagram illustrating the constitution of the control apparatus 10 illustrated in FIG. 1.

In FIG. 2, the control apparatus 10 has a main controller 100. Here, an image processing block for processing the image data received from the scanner unit 11 and the like, and a CPU (Central Processing Unit) 201 (FIG. 3) for controlling the main controller 100 overall are built in the main controller 100.

Further, the main controller 100 is equipped with interfaces for connecting external devices respectively. Here, the interfaces include a DRAM bus 115, a scanner interface 110, a printer interface 111, and an operation panel interface 114. More specifically, the DRAM bus 115 is used to transmit/receive data to/from a DRAM 101, the scanner interface 110 is used to receive the image data from the scanner unit 11, and the printer interface 111 is used to transmit the image data to the printer unit 12. Further, the operation panel interface 114 is used to receive the input instruction from the operation panel 14 and transmit data concerning operation screens, messages and the like to the operation panel 14.

A general-purpose bus 112 is the bus to which various devices such as a ROM (Read Only Memory) for storing therein a system program used by the main controller 100, a modem 103, and the like are connected.

The DRAM 101 is connected to the DRAM bus 115, and used as a working area for the image processing block and an image data holding memory by the CPU 201 (FIG. 3) of the main controller 100. Further, various programs transferred from the ROM 102 are stored in the DRAM 101, and controlling is performed by the CPU 201 (FIG. 3) of the main controller 100. Furthermore, the DRAM 101 has, as a power saving function, a self refresh function capable of reducing consumption of power as holding the data.

Incidentally, a self refresh operation of the DRAM 101 will be described.

Generally, a DRAM holds or stores information by accumulating electric charges in a storage element provided inside the DRAM, and expresses information corresponding to one bit based on two states of presence and absence of the electric charge in each storage element. Therefore, a fact that the electric charge in the storage element is lost implies that the information is lost, that is, loss of data.

However, if each storage element of the DRAM is left as it is without any electric charge holding operation, the electric charge leaks and goes out as a current, whereby the electric charge in the relevant storage element is lost if a predetermined time lapses. Consequently, it is necessary for the DRAM to periodically replenish the electric charges of the storage elements to prevent data from being lost. Such an operation is called the refresh operation.

Basically, the refresh operation of the storage element of the DRAM is periodically performed to the DRAM (i.e., the DRAM 101) by a memory controller (i.e., a DRAM controller 208 illustrated in FIG. 3) for performing operation control of the DRAM. In a refresh mode (i.e., a first refresh mode), the DRAM 101 performs the above-described refresh operation in response to a signal sent from the DRAM controller 208.

On the other hand, in such a case where the DRAM bus 115 is set to a deactivation state, the refresh operation to the DRAM 101 cannot be performed from the DRAM controller 208. For this reason, the DRAM 101 itself performs the refresh operation by using a secondary power supply. Such an operation is called the self refresh operation. In a self refresh mode (i.e., a second refresh mode), the DRAM 101 performs the above-described self refresh operation.

Incidentally, although various kinds of memories can be used as the DRAM 101, it is assumed in the present embodiment that a DDR SDRAM (Double-Data-Rate SDRAM) is used as the DRAM 101. Here, it should be noted that the DDR SDRAM is the SDRAM based on the memory standard in which high-speed memory transfer is achieved by increasing a memory bus clock to twice that of the SDRAM.

Further, the DRAM bus 115 is based on, e.g., an SSTL2 (Stub Series Terminated Logic for 2.5V) standard. This standard has been provided for supplying an intermediate voltage (e.g., 1.25V) of a power supply voltage (e.g., 2.5V) of a memory system to each signal line. According to the SSTL2 standard, in regard to a signal level of each signal line constituting the DRAM bus 115, a level which is equal to or higher than 1.6V being higher than reference potential (VREF) such as 1.25V by 0.35V or more is considered as an H (high) level. On the other hand, a level which is equal to or lower than 0.90V being lower than the reference potential by 0.35V or more is considered as an L (low) level.

The modem 103 is connected to an NCU (Network Control Unit) 104 which is further connected to a PSTN line (i.e., a public network). The modem 103 can transmit image data to an external facsimile machine or the like through the PSTN line by modulating image data or the like received from the main controller 100 and then transferring the modulated image data to the NCU 104. Further, the NCU 104 can receive facsimile data transmitted from the external facsimile machine through the PSTN line.

A network I/F (interface) 105 receives print data (including information concerning image data to be processed by the image processing apparatus 1) or the like from a not-illustrated host computer being an external apparatus through a LAN (Local Area Network).

A control apparatus power supply 107 receives a voltage from the power supply unit 13, generates respective driving voltages for the circuits such as the main controller 100 and the like provided in the control apparatus 10 by converting the received voltage, and supplies the generated driving voltages to the respective circuits.

A VT power supply (i.e., a termination power supply) 106 is the reference voltage supply unit which receives the voltages from the control apparatus power supply 107, and thus generates voltages (i.e., reference voltages) to be applied to the respective data signal lines (i.e., signal lines 310 to 321 illustrated in later-described FIG. 4) of the DRAM bus 115 through a terminal resistor. More specifically, in the VT power supply 106, a VT power supply interruption signal is received from the main controller 100 through a signal line 117, and power supply on control and power supply off control are performed in response to the received VT power supply interruption signal. Here, in the power supply on control, a voltage (e.g., a voltage of 1.25V) of intermediate potential according to the SSTL2 standard being the interface of the DRAM (DDR SDRAM) 101 is output. Further, in the power supply off control, a voltage is output in a high impedance state.

In the VT power supply 106, a voltage stabilizing unit such as a regulator is inserted between the power supply and the DRAM bus 115, and an output of the regulator is switched in response to the VT power supply interruption signal. Alternatively, in the VT power supply 106, a semiconductor switch may be inserted between the output of the VT power supply and the DRAM bus 115 so as to perform on/off control of the semiconductor switch in response to the VT power interruption signal.

Figure 3:
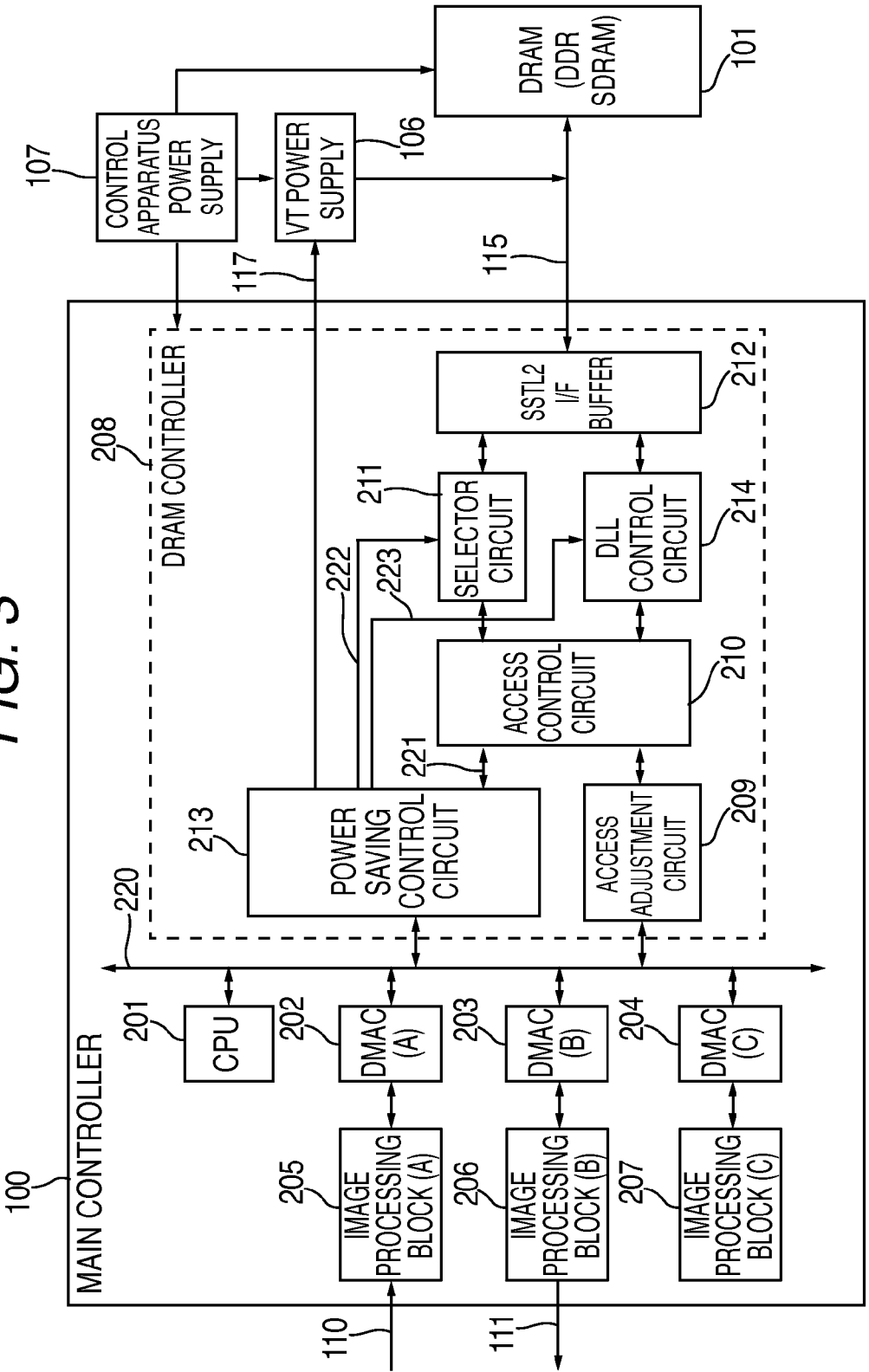
FIG. 3 is a block diagram for describing the internal circuits of a main controller 100.

FIG. 3 is a block diagram for describing the internal circuits of the main controller 100 illustrated in FIG. 2.

In FIG. 3, the CPU 201 controls the main controller 100 overall. Further, the CPU 201 is connected to a system bus 220 which is used to transmit/receive data and control signals among the plural circuits provided in the main controller 100.

A DMAC (Direct Memory Access Controller) (A) 202 is the control circuit which is used to DMA (Direct Memory Access) transfer image data input from an image processing block (A) 205 to the DRAM 101.

Further, the image processing block (A) 205 is the circuit block which performs an image process to the image data input from the scanner interface 110. For example, the image processing block (A) 205 has a function of performing shading correction to the image data. More specifically, in the shading correction, in regard to data corresponding to one line in the main scan direction (i.e., the direction perpendicular to an original transporting direction) of the image data obtained by reading an original, predetermined luminance correction is performed at each position in the main scan direction.

A DMAC (B) 203 is the control circuit which is used to DMA transfer the image data stored in the DRAM 101 to an image processing block (B) 206 through the system bus 220. For example, the image processing block (B) 206 is the circuit block which has a function of performing a predetermined smoothing process to the input image data and at the same time transmitting the processed image data to the printer interface 111.

A DMAC (C) 204 is the control circuit which is used to DMA transfer the image data stored in the DRAM 101 to an image processing block (C) 207 through the system bus 220. For example, the image processing block (C) 207 is the circuit block which has a function of performing an image data format conversion process (e.g., converting bitmap format data into JPEG (Joint Photographic Experts Group) format data), a magnification change process, an image rotation process and the like to the input image data.

The DRAM controller 208 controls the operation of the DRAM 101 so that various data are transmitted/received between the DRAM controller 208 and the DRAM 101 through the DRAM bus 115. Besides, the DRAM controller 208 is the controller which adjusts access requests from the CPU 201, the DMAC (A) 202, the DMAC (B) 203 and the DMAC (C) 204 to the DRAM 101, and also controls accesses to the DRAM 101.

An access adjustment circuit 209 judges, if the access requests are transferred from the CPU 201, the DMAC (A) 202, the DMAC (B) 203 and the DMAC (C) 204 to the DRAM 101 at the same time, which of the access requests should be given priority. Besides, the access adjustment circuit 209 is the circuit which performs control so that the data is transferred from the DMAC in which priority has been given to the access thereof to the DRAM 101.

An access control circuit 210 generates various control signals for accessing the DRAM 101, based on a use request signal of the DRAM bus 115 from the DMAC which has been selected by the access adjustment circuit 209 and performs the data transfer to/from the DRAM 101. Moreover, the access control circuit 210 performs control so that the DRAM 101 transitions into a self refresh state (i.e., the self refresh mode), in response to a signal received from a later-described power saving control circuit 213 through a signal line 221.

A selector circuit 211 switches over a signal to be output to an SSTL2 I/F buffer 212 in response to a DRAM bus select signal received from the power saving control circuit 213 through a signal line 222. In an ordinary operation in which the DRAM bus select signal is not received from the power saving control circuit 213, the selector circuit 211 causes to output the data from the access control circuit 210 to the SSTL2 I/F buffer 212. Further, if the DRAM bus select signal is received from the power saving control circuit 213, the selector circuit 211 outputs the signal of which the level has been changed over to a LOW level to the SSTL2 I/F buffer 212, for the output signal of the DRAM bus 115.

The SSTL2 I/F buffer 212 has plural buffer circuits each of which is provided for each of the data signal lines together constituting the DRAM bus 115.

Figure 4:
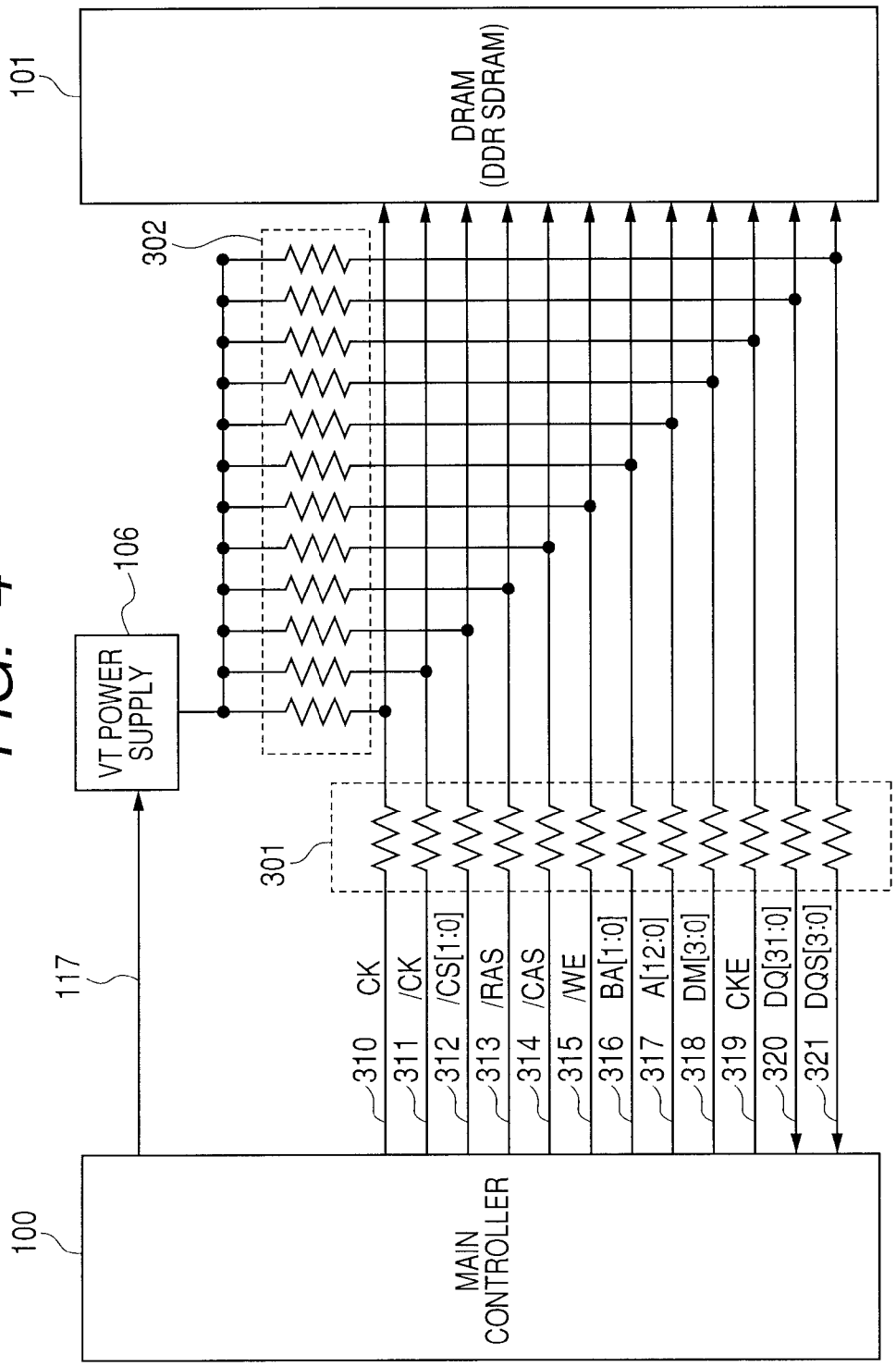
FIG. 4 is a block diagram illustrating the connection constitution between a DRAM controller 208 and a DRAM 101.

Here, it should be noted that the plural data signal lines which constitute the DRAM bus 115 include the following signal lines, as illustrated in FIG. 4.

CK (Clock) line 310
/CK (Clock) line 311
/CS (Chip Select) line 312
/RAS (Row Address Strobe) line 313
/CAS (Column Address Strobe) line 314
/WE (Write Enable) line 315
BA (Bank Address) line 316

A (Address) line 317
DM (Data Mask) line 318
CKE (Clock Enable) line 319
DQ (Data) line 320
DQS (Data Strobe) line 321

Incidentally, the signal lines which constitute the DRAM bus 115 may include data lines other than the above-described signal lines.

Here, the connection constitution between the DRAM controller 208 and the DRAM 101 will be described with reference to FIG. 4. Incidentally, it should be noted that such connection is established through the DRAM bus 115.

That is, FIG. 4 is the block diagram illustrating the connection constitution between the DRAM controller 208 and the DRAM 101 through the DRAM bus 115.

In FIG. 4, a resistor 301 is illustrated. Here, the resistor 301 is connected in series to the signal lines 310 to 321 constituting the DRAM bus 115.

Further, a resistor 302 to be used for a terminal resistor is provided to pull up the voltages of the respective signal lines 310 to 321 of the DRAM bus 115 to a termination voltage by using the VT power supply 106. As illustrated in FIG. 4, the power supply voltage from the VT power supply 106 is supplied to the respective signal lines 310 to 321 through the resistor 302.

Hereafter, the description will return to the circuit constitution illustrated in FIG. 3.

The SSTL2 I/F buffer 212 acts as an output buffer circuit for each of the signal lines 310 to 319 of the DRAM bus 115 illustrated in FIG. 4, and acts as a bidirectional buffer circuit for each of the DQ signal line 320 and the DQS line 321.

A DLL (Delay Lock Loop) control circuit 214 generates clock signals (CK, /CK) to be output to the DRAM 101 respectively through the clock signal supply lines 310 and 311 of the DRAM bus 115, based on a clock output from the access control circuit 210. More specifically, the DLL control circuit 214 performs phase adjustment with the data output from the selector circuit 211, and generates the clock signal CK and the clock signal /CK obtained by inverting the clock signal CK, both to be output to the DRAM 101.

Further, the DLL control circuit 214 stops outputting the clock signal CK and the clock signal /CK to the DRAM bus 115 by transitioning into a standby state based on a DLL standby signal 223 output from the power saving control circuit 213.

If the DLL standby signal 223 output from the power saving control circuit 213 is interrupted, the DLL control circuit 214 returns from the standby state. However, in such a case, it takes a predetermined time from the interruption of the DLL standby signal 223 to the restart of the outputs of the clock signal CK and the clock signal /CK to the DRAM bus 115. Here, it should be noted that the predetermined time is equivalent to a time from completion of clock phase control to return of a DRAM clock to a DRAM accessible phase, and this is different according to the constitution of the DLL control circuit and a control method.

Subsequently, in a case where a power saving control request signal is received from the CPU 201 through the system bus 220, the power saving control circuit 213 performs power saving control to the DRAM controller 208.

Here, it should be noted that the case where the power saving control request signal from the CPU 201 is received by the power saving control circuit 213 is equivalent to a case where it is judged by the CPU 201 of the main controller 100 that a condition of transitioning the image processing apparatus 1 into a predetermined power saving state is established.

For example, in at least one of the following cases (1) to (3), the power saving control circuit 213 transitions the image processing apparatus 1 into the power saving state. That is, the power saving control circuit 213 transitions the DRAM 101 into the self refresh state, and also changes over the signal levels of the DRAM bus 115, thereby performing power supply off control to the VT power supply 106.

Case (1): it is judged that the network I/F 105 does not receive the print data including the image data to be subjected to the image formation process by the image processing apparatus 1 from a host computer being an external apparatus through the LAN for a predetermined time.

Case (2): it is judged that the NCU 104 does not receive the print data including the image data to be subjected to the image formation process by the image processing apparatus 1 from a facsimile machine being an external apparatus through the PSTN line.

Case (3): it is judged that the operation panel 14 does not accept an operator's input for a predetermined time.

The power saving control circuit 213 includes two counter circuits (i.e., a counter 1 and a counter 2) and two register circuits (i.e., a counter 1 setting register and a counter 2 setting register) for respectively setting the count values for the respective counter circuits. It should be noted that these circuits are used to set, in case of returning the image processing apparatus 1 from the power saving state, start timing of releasing the VT power supply interruption signal on the signal line 117 and the DRAM bus select signal on the signal line 222 after releasing the DLL standby signal 223.

Hereinafter, an operation in the power saving control to be performed by the DRAM controller 208 will be described with reference to FIGS. 5 and 6.

Figure 5:
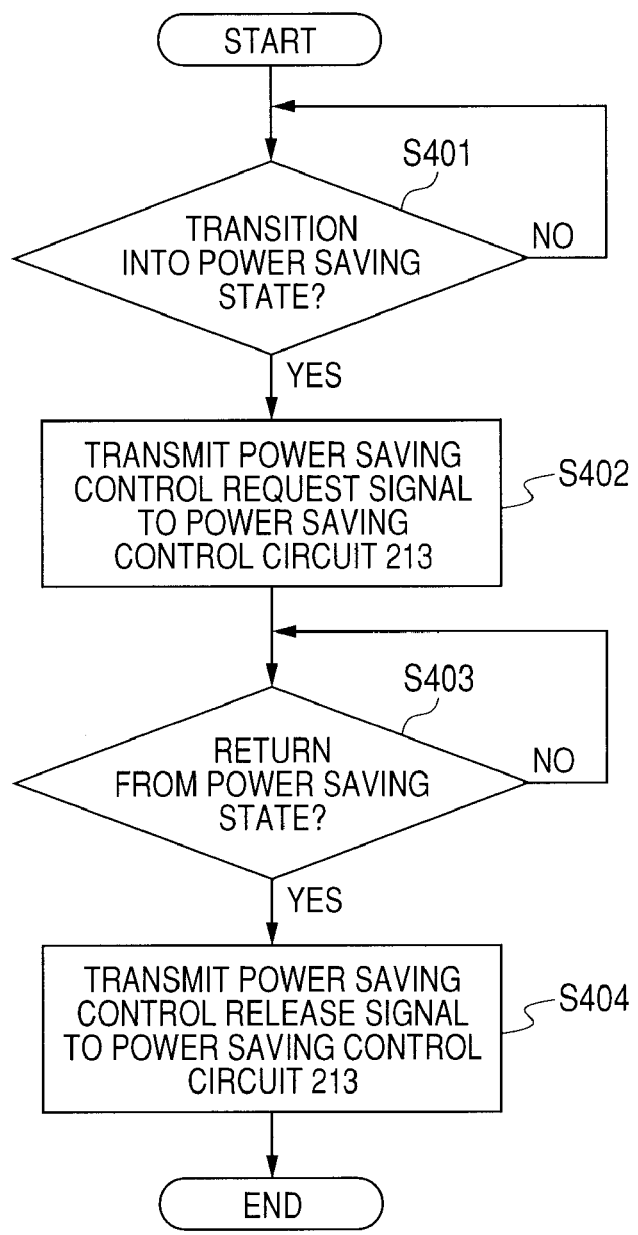
FIG. 5 is a flow chart illustrating a power saving control operation of the DRAM controller 208.

FIG. 5 is the flow chart for describing the operation in the power saving control to be performed by the DRAM controller 208. Here, it should be noted that the process described in the flow chart corresponds to the power saving control which is performed by the CPU 201 based on the program stored in the ROM 102 (or transferred from the ROM 102 and then stored in the DRAM 101).

In a step S401, if it is judged by the CPU 201 that the condition of transitioning the image processing apparatus 1 into the predetermined power saving state is established (YES in the step S401), the flow advances to a step S402 to output the power saving control request signal to the power saving control circuit 213.

Based on the operation (i.e., control) by the power saving control circuit 213 which received the power saving control request signal, the DRAM 101 transitions into the self refresh mode, whereby power to be supplied from the terminal power supply to the terminal through a memory bus line is interrupted. Incidentally, the concrete operation of the power saving control circuit 213 will be described later with reference to FIGS. 6 and 7.

Incidentally, it is assumed that the case where it is judged by the CPU 201 in the step S401 that the condition of transitioning the image processing apparatus 1 into the predetermined power saving state is established corresponds to, for example, a case where at least one of the above judgment cases (1) to (3) is performed.

Subsequently, in a step S403, the CPU 201 holds the power saving state until it is judged that the condition of returning the image processing apparatus 1 from the power saving state is established (that is, until YES is obtained in the step S403). If it is judged by the CPU 201 in the step S403 that the condition of returning the image processing apparatus 1 from the power saving state is established (YES in the step S403), the flow advances to a step S404 to output a power saving control release signal to the power saving control circuit 213.

The interruption of the power supplied from the terminal power supply to the terminal of the memory bus line is released by the operation of the power saving control circuit 213 which received the power saving control release signal, and the DRAM 101 then transitions into the ordinary mode. The operation of the power saving control circuit 213 will be described later with reference to FIG. 6.

Incidentally, it is assumed that the case where it is judged by the CPU 201 in the step S403 that the condition of returning the image processing apparatus 1 from the power saving state is established corresponds to, for example, a case where at least one of the following cases (4) to (6) is judged as an interrupt signal from a not-illustrated interrupt control unit.

Case (4): the network I/F 105 receives the print data including the image data to be subjected to the image formation process by the image processing apparatus 1 from the host computer being an external apparatus through the LAN.

Case (5): the NCU 104 receives the print data including the image data to be subjected to the image formation process by the image processing apparatus 1 from the facsimile machine being an external apparatus through the PSTN line.

Case (6): the operation panel 14 accepts an operator's input.

Incidentally, it is assumed that the CPU 201 does not access the DRAM 101 while the power saving control is being performed by the power saving control circuit 213. Then, after the power saving control of the power saving control circuit 213 is released in the step S404, the CPU 201 can access the DRAM 101.

Subsequently, the operation to be performed by the power saving control circuit 213 in the power saving control of the DRAM controller 208 will be described with reference to the timing chart illustrated in FIG. 6.

Figure 6:
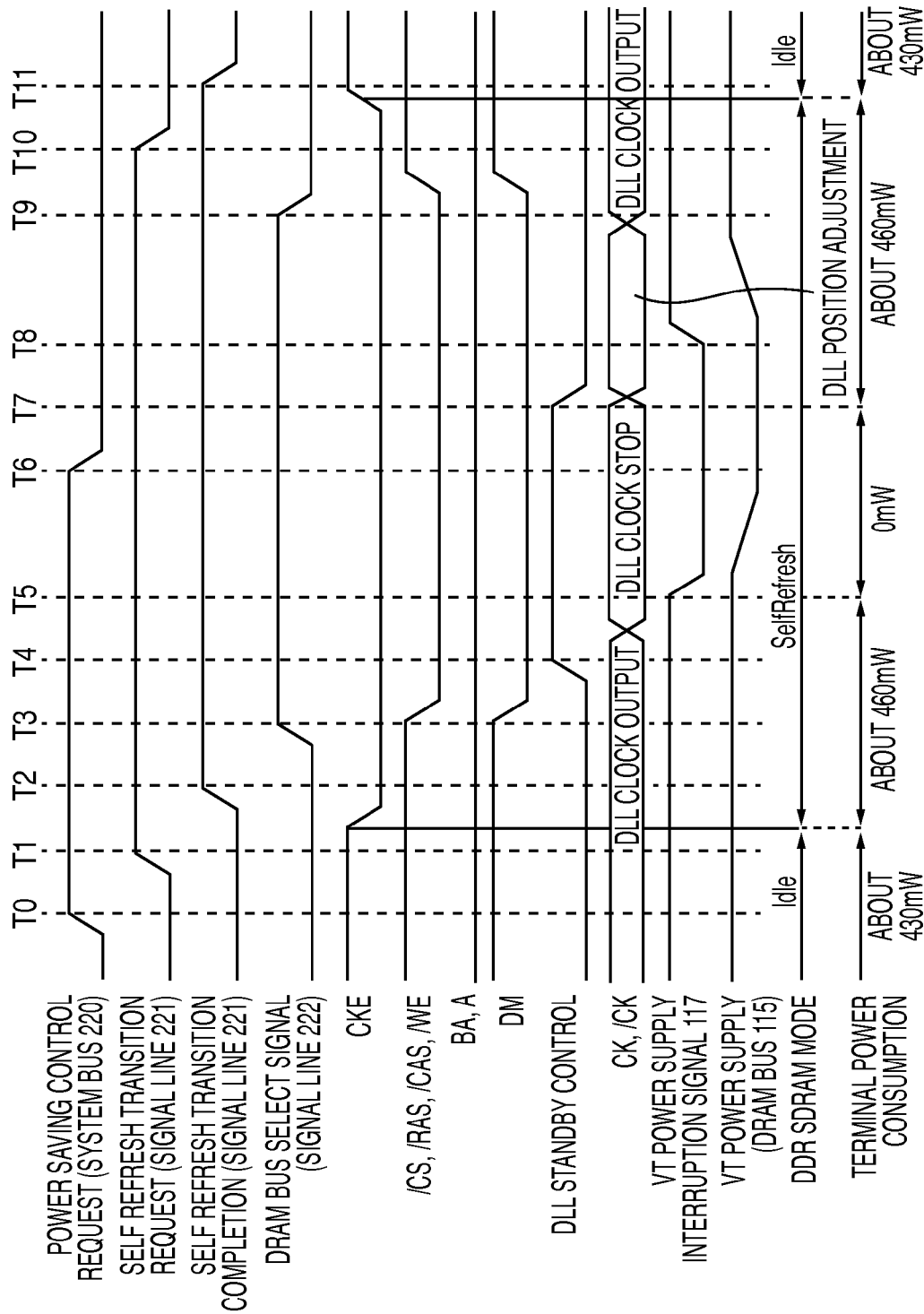
FIG. 6 is a timing chart for describing an operation performed by a power saving control circuit 213.

That is, FIG. 6 is the timing chart for describing the operation which is performed by the power saving control circuit 213 in the power saving control of the DRAM controller 208.

FIG. 6 illustrates the input and output signals of the power saving control circuit 213, the output states of the VT power supply 106, and the output signals supplied on the signal lines 310 to 319 of the DRAM bus 115. Incidentally, it is assumed that the levels of the input and output signals of the power saving control circuit 213 illustrated in FIG. 6 are changed in dependent upon the circuit constitution of the power saving control circuit 213. Further, FIG. 6 illustrates respective times T0 to T11.

If the power saving control circuit 213 receives, at the time T0, the power saving control request signal (i.e., the signal transmitted in the step S402) from the CPU 201, the power saving control circuit 213 performs, at the time T1, the transition control to the access control circuit 210 so that the DRAM 101 transitions into the self refresh state. Incidentally, the power saving control circuit 213 performs the transition control of the DRAM 101 into the self refresh state by notifying a self refresh transition request.

Here, the access control circuit 210 which received the self refresh transition request outputs a self refresh command to the DRAM bus 115, and then sets the level of the signal on the CKE line 319 from HIGH to LOW. Thus, the transition of the DRAM 101 into the self refresh state is performed. Then, if the transition of the DRAM 101 into the self refresh state is completed, the access control circuit 210 notifies the power saving control circuit 213 of the completion of the transition of the DRAM 101 into the self refresh state by using a transition completion signal.

If the power saving control circuit 213 detects, at the time T2, the completion of the transition of the DRAM 101 into the self refresh state from the access control circuit 210, then the power saving control circuit 213 outputs, at the time T3, the DRAM bus select signal to the selector circuit 211.

The selector circuit 211 which received the DRAM bus select signal switches over the outputs signals to the output signal lines 312 to 319 of the DRAM bus 115 from the outputs signals from the access control circuit 210 to the signals of which the levels are fixed to LOW (i.e., the low level signals of which the voltage values are lower than the reference voltage of the output signal lines 310 to 319 of the DRAM bus 115) (signal state fixation).

The power saving control circuit 213 outputs, at the time T4, the DLL standby signal 223 to the DLL control circuit 214 to transition the DLL control circuit 214 into the standby state, thereby stopping the outputs of the clock signal CK and the clock signal /CK to the DRAM bus 115. Here, the levels of the signals on the CK line 310 and the /CK line 311 transmitted up to this time are fixed to LOW.

Incidentally, a clock to be output from the access control circuit 210 to a DRAM clock generation circuit (not illustrated) may be stopped to stop the outputs of the clock signal CK and the clock signal /CK to the DRAM bus 115. In this case, it is possible to further reduce the power consumption of the DRAM clock generation circuit.

The power saving control circuit 213 outputs, at the time T5, the VT power supply interruption signal to the VT power supply 106 through the signal line 117, thereby stopping the supply of the reference voltage from the VT power supply 106 to the DRAM bus 115. Incidentally, in the timing chart illustrated in FIG. 6, the VT power supply interruption signal on the signal line 117 is output at the time T5 after the DLL standby signal 223 was output at the time T4. However, these signals may be output at the same time.

If the VT power supply interruption signal on the signal line 117 is output at the time T5, the output voltage of the VT power supply 106 is transitioned from 1.25V to 0V. In this case, a transition time differs according to the lord capacity (i.e., the capacities of the pattern, the capacitor and the like on the substrate) of the wiring to which the VT power supply 106 is connected. In the timing chart illustrated in FIG. 6, the transition time is about several hundreds of microseconds, and the output voltage gently transitions as compared with other signals.

Subsequently, if the power saving control circuit 213 receives, at the time T6, a power saving control return signal from the CPU 201 through the system bus 200, then the power saving control circuit 213 releases, at the time T7, the DLL standby signal 223 for the DRAM clock generation circuit. If the DLL standby signal 223 is released, the standby state of the DLL control circuit 214 is released. Subsequently, the power saving control circuit 213 releases, at the time T8, the VT power supply interruption signal on the signal line 117 for the VT power supply 106. Thus, the supply of the reference voltage from the VT power supply 106 to the DRAM bus 115 is started.

Here, it takes a predetermined time (e.g., 500 μsec) from the release of the standby state of the DLL control circuit 214 to the completion of the clock phase control. Further, it takes a predetermined time (e.g., 300 μsec) from the reception of the release of the VT power supply interruption signal on the signal line 117 by the VT power supply 106 to the output of the sufficient output voltage by the VT power supply 106 as the terminal voltage of the DRAM 101.

In the timing chart illustrating in FIG. 6, after 200 μsec lapses from the release of the DLL standby signal 223 at the time T7, the VT power supply interruption signal on the signal line 117 is released at the time T8. Thus, the output of the reference voltage can be started by the VT power supply 106 before the clock phase control of the DLL standby signal 223 is completed. If the output of the reference voltage is started by the VT power supply 106 after the clock phase control of the DLL standby signal 223 was completed, it takes 800 μsec to complete both the release controls, whereby the release time can be shortened by 300 μsec. Therefore, it is assumed that the CPU 201 previously sets the count value corresponding to 200 μsec in the counter setting register (i.e., the counter 1 setting register) for start timing of releasing the VT power supply interruption signal in the power saving control circuit 213, and also previously sets the count value corresponding to 300 μsec in the counter setting register (i.e., the counter 2 setting register) for start timing of releasing the DRAM bus select signal.

The power saving control circuit 213 releases, at the time T9 after 300 μsec lapses from the time T8, the DRAM bus select signal output by the selector circuit 211, and switches over the output signals, other than the signal on the CKE line 319, to be output to the DRAM bus 115 to the output signal from the access control circuit 210.

The selector circuit 211, which accepted the release of the DRAM bus select signal, switches over the output signals to be output to the output signal lines 312 to 319 of the DRAM bus 115 from the signals of which the levels have been fixed to LOW to the output signal from the access control circuit 210 (signal state release). Further, since the clock phase control is completed, the oscillated signals are output to the CK line 310 and the /CK line 311.

Subsequently, the power saving control circuit 213 releases, at the time T10, a self refresh transition request signal to request the access control circuit 210 to perform return control from the self refresh state.

The access control circuit 210, which accepted the release of the self refresh transition request signal, sets the level of the signal on the CKE line 319 from LOW to HIGH for the DRAM bus 115, whereby the transition of the DRAM 101 into the self refresh state is performed.

Then, the access control circuit 210 notifies the power saving control circuit 213 of the completion of the return from the self refresh state by using a self refresh transition completion signal.

If the completion of the return from the self refresh state is notified from the access control circuit 210, the power saving control circuit 213 completes, at the time T11, the power saving control, and notifies the CPU 201 of the completion of the power saving control.

Incidentally, in FIG. 6, all the memory banks of the DRAM 101 are in an idling state when the CPU 201 outputs the power saving control request signal. However, it is assumed that the DRAM 101 may be in a state other than the self refresh state in such a case.

Further, after the time T1, it is assumed that, if the DRAM 101 is in the state other than the idling state, for example, if the DRAM 101 is being accessed, the access control circuit 210 outputs the self refresh command (i.e., the self refresh transition request signal) after the DRAM 101 entered the idling state.

Figure 7:
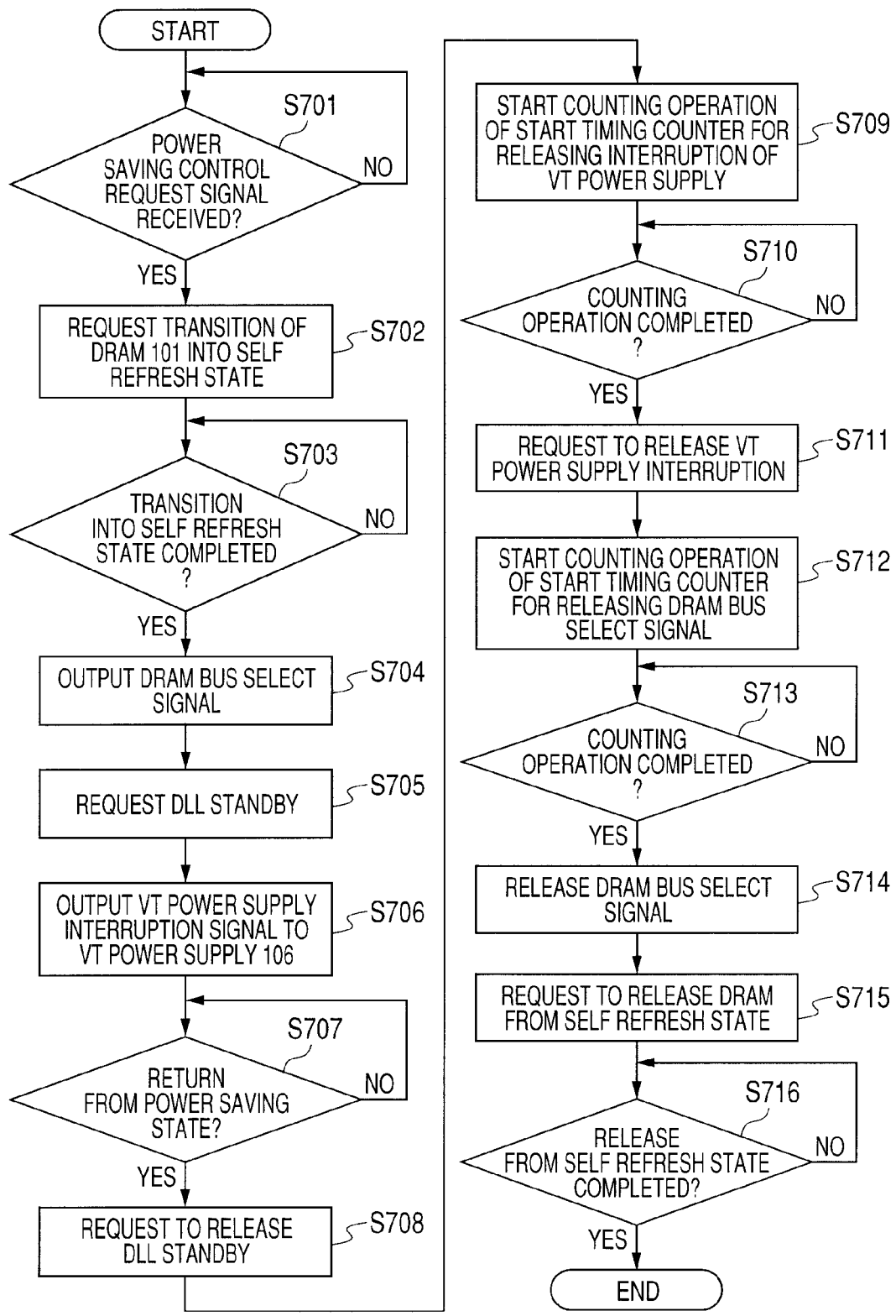
FIG. 7 is a flow chart for describing the operation performed by the power saving control circuit 213.

Subsequently, the operation to be performed by the power saving control circuit 213 will be described with reference to a flow chart illustrated in FIG. 7.

In a step S701, if the power saving control circuit 213 receives the power saving control request signal from the CPU 201 (YES in the step S701), then the power saving control circuit 213 requests the access control circuit 210 to perform the control so that the DRAM 101 transitions into the self refresh state (step S702).

In a step S703, if the power saving control circuit 213 detects from the access control circuit 210 the completion of the transition of the DRAM 101 into the self refresh state (YES in the step S703), then the power saving control circuit 213 outputs the DRAM bus select signal to the selector circuit 211 through the signal line 222 (step S704).

Then, in a step S705, the power saving control circuit 213 outputs the DLL standby signal 223 to the DRAM clock generation circuit.

In a step S706, the power saving control circuit 213 outputs the VT power supply interruption signal to the VT power supply 106 through the signal line 117.

In a step S707, the power saving control circuit 213 is on standby until the power saving control return request is received from the CPU 201 (NO in the step S707). Then, if the power saving control return request is received from the CPU 201 (YES in the step S707), the power saving control circuit 213 outputs the DLL standby signal 223 (step S708).

In a step S709, the power saving control circuit 213 starts counting of the timing counter (i.e., the counter 1) for starting the release of the interruption of the VT power supply. If the counted value reaches the setting value of the counter 1 setting register (YES in a step S710), then the power saving control circuit 213 completes the counting of the counter 1, and releases the output of the VT power supply interruption signal on the signal line 117 (step S711).

In a step S712, the power saving control circuit 213 starts counting of the timing counter (i.e., the counter 2) for starting the release of the DRAM bus select signal. If the counted value reaches the setting value of the counter 2 setting register (YES in a step S713), then the power saving control circuit 213 completes the counting of the counter 2, and releases the DRAM bus select signal on the signal line 222 (step S714).

Next, in a step S715, the power saving control circuit 213 requests the access control circuit 210 to perform the control so that the DRAM 101 returns from the self refresh state.

In a step S716, if the completion of the release of the DRAM 101 from the self refresh state is detected from the access control circuit 210 (YES in the step S716), the power saving control circuit 213 ends the power saving control.

Subsequently, for the purpose of being indicative of an effect of the present invention, power consumption changes in the resistors 301 and 302 illustrated in FIG. 4 will be described with reference to the timing chart illustrated in FIG. 6.

Incidentally, the numeric values of the power consumption change according to the number of signals on the DRAM bus 115, the width of the bus and the resistances of the resistors 301 and 302. Further, the power consumption changes according to the states of the respective signal levels of the DRAM bus 115 (i.e., the number of HIGH level signals and the number of LOW level signals) in the respective on and off states of the VT power supply 106.

In FIG. 6, the power of about 430 mW is consumed in the resistors (i.e., terminals) 301 and 302 until the DRAM 101 transitions from the idling state into the self refresh state (that is, until the level of the signal on the CKE line 319 after the time T1 is switched over to the LOW level).

After the output signals on the DRAM bus 115 in the present invention were set to the LOW level in the self refresh state of the DRAM 101, if the VT power supply 106 is turned off, the power consumption in the resistors 301 and 302 (i.e., the terminal power consumption) becomes 0 mW.

Here, it is assumed that the present invention is not applied. In such a case, if the VT power supply 106 is turned off while the DRAM 101 is still in the idling state, the power of about 230 mW is consumed in the resistors (i.e., terminals) 301 and 302.

Consequently, it is impossible to expect sufficient reduction of the power consumption if only turning off the VT power supply 106 without applying the present invention.

Also, the VT power supply 106 itself consumes the power. Although the power consumption is 0 mW when the VT power supply 106 is off, the consumed power changes according to the states of the respective signal levels of the DRAM bus 115 when the VT power supply 106 is on.

In the circuit constitution illustrated in FIG. 4, the power which is consumed by the regulator of the VT power supply 106 is about 100 mW in the idling state. Incidentally, if the constitutions of the regulator of the VT power supply 106 are increased to interrupt the VT power supply 106, the power which is consumed at the time of on of the VT power supply 106 increases.

It is possible to reduce the power consumption of the image processing apparatus 1 by making the circuit constitution of the VT power supply 106 small as in the present invention.

Incidentally, in the present embodiment, the power consumption control is performed by the hardware of the power saving control circuit 213. However, the operation of the power saving control circuit 213 may be controlled by software under the control of the CPU 201.

As just described above, in order to achieve further power saving in the case where the DRAM 101 transitions into the self refresh state, the DRAM controller 208 changes over the level of the output signal of the DRAM bus 115 to the LOW level and then fixes the relevant level in case of performing the off control of the VT power supply. Subsequently, after the DRAM controller 208 fixed the output signal level of the DRAM bus 115 to the LOW level, the VT power supply is turned off. Thus, it is possible to prevent a current from flowing in regard to the CKE signal concerning the transition of the DRAM 101 into the self refresh state, and it is thus possible to maintain the LOW level state of the CKE signal. That is, in the case where the DRAM 101 transitions into the self refresh state (i.e., the power saving state), it is possible to prevent that the unnecessary power consumption occurs in the terminal since the current flows from the HIGH level signal to the LOW level signal through the terminal circuit (that is, the current is turned from the HIGH level signal to the LOW level signal).

Further, the VT power supply interruption unit (i.e., the VT power supply 106) can be constituted by one regulator and one semiconductor switch, whereby the power consumption can be reduced by the small-scale circuit constitution. In other words, it is possible to reduce the power consumption in the VT power supply interruption unit even in the ordinary operation that there is no transition into the power saving state, whereby it is possible to achieve further power saving.

Incidentally, the constitutions of the above-described various signal lines are not limited to the present embodiment. That is, it is needless to say that various constitutions and contents can be used according to use and intended purpose.

The embodiment of the present invention is described as above. Besides, it should be noted that the present invention can be carried out as, for example, a system, an apparatus, a method, a program, a storage medium or the like. More specifically, the present invention may be applied to a system which consists of plural devices or to an apparatus which includes only one device.

Incidentally, in the present embodiment, the image processing apparatus is described as an example of the data storage apparatus according to the present invention. However, the present invention is applicable to any apparatus if it has a data storage unit such as the above-described DRAM which can transition into the power saving state by means of the power saving function. For example, the data storage apparatus according to the present invention is applicable to a personal computer.

Other Embodiments

Aspects of the present invention can also be realized by a computer of a system or apparatus (or devices such as a CPU or an MPU) that reads out and executes a program recorded on a memory device to perform the functions of the above-described embodiment, and by a method, the steps of which are performed by a computer of a system or an apparatus by, for example, reading out and executing a program recorded on a memory device to perform the functions of the above-described embodiment. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-063202, filed Mar. 16, 2009, which is hereby incorporated by reference herein in its entirety.

What is claimed is:

1. A data storage apparatus which includes a data storage unit configured to store data, comprising:
    an operation control unit configured to control an operation of the data storage unit so as to transmit/receive the data to/from the data storage unit, through a bus including plural signal lines;
    a judgment unit configured to judge whether or not a condition of transitioning the data storage apparatus into a power saving state is established;
    a reference voltage supply unit configured to supply a reference voltage to the plural signal lines; and
    a power control unit configured to, in a case where it is judged by the judgment unit that the condition of transitioning the data storage apparatus into the power saving state is established, fix states of signals to be output by the operation control unit to the plural signal lines to a specific signal state and control to stop the supply of the reference voltage by the reference voltage supply unit.

2. The data storage apparatus according to claim 1, wherein the power control unit controls to stop the supply of the reference voltage by the reference voltage supply unit after fixing the states of the signals to be output by the operation control unit to the plural signal lines to the specific signal state.

3. The data storage apparatus according to claim 1, wherein
the judgment unit judges whether or not a condition of returning the data storage apparatus from the power saving state is established, and
in a case where it is judged by the judgment unit that the condition of returning the data storage apparatus from the power saving state is established, the power control unit controls the reference voltage supply unit to restart supplying the reference voltage and controls to release the fixation of the states of the signals to be output to the plural signal lines by the operation control unit.

4. The data storage apparatus according to claim 3, wherein the power control unit controls to release the fixation of the states of the signals to be output to the plural signal lines by the operation control unit, after restarting the supply of the reference voltage by the reference voltage supply unit.

5. The data storage apparatus according to claim 1, wherein the specific signal state is a state in which the operation control unit outputs a low level signal of which a voltage value is lower than the reference voltage of the plural signal lines.

6. The data storage apparatus according to claim 1, wherein the reference voltage supply unit supplies the reference voltage to the plural signal lines through a terminal resistor of the data storage apparatus.

7. The data storage apparatus according to claim 1, wherein
the data storage unit is a DRAM (Dynamic Random Access Memory) which performs a refresh operation for holding the data, and
the data storage apparatus comprises a transmission unit configured to transmit a signal for causing the DRAM to perform the refresh operation through the bus.

8. The data storage apparatus according to claim 7, wherein the DRAM performs the refresh operation in either one of a first refresh mode of performing the refresh operation based on the signal input through the bus and for causing to perform the refresh operation and a second refresh mode of performing the refresh operation without using the signal for causing to perform the refresh operation.

9. The data storage apparatus according to claim 1, wherein, in a case where it is judged by the judgment unit that the condition of transitioning the data storage apparatus into the power saving state is established, the operation control unit controls to interrupt a clock signal supplied to the data storage unit through a clock supply signal line.

10. A control method of a data storage apparatus which includes a data storage unit configured to store data, an operation control unit configured to control an operation of the data storage unit so as to transmit/receive the data to/from the data storage unit through a bus including plural signal lines, and a reference voltage supply unit configured to supply a reference voltage to the plural signal lines, the method comprising:
judging whether or not a condition of transitioning the data storage apparatus into a power saving state is established;
in a case where it is judged that the condition of transitioning the data storage apparatus into the power saving state is established, causing a power control unit to fix states of signals to be output by the operation control unit to the plural signal lines to a specific signal state; and
in the case where it is judged that the condition of transitioning the data storage apparatus into the power saving state is established, causing the power control unit to stop the supply of the reference voltage by the reference voltage supply unit.

11. The control method according to claim 10, wherein the supply of the reference voltage by the reference voltage supply unit is stopped after the states of the signals to be output by the operation control unit to the plural signal lines are fixed to the specific signal state.

12. The control method according to claim 10, wherein
it is judged whether or not a condition of returning the data storage apparatus from the power saving state is established, and
the control method further comprises causing, in a case where it is judged that the condition of returning the data storage apparatus from the power saving state is established, the reference voltage supply unit to restart supplying the reference voltage.

13. The control method according to claim 12, wherein it is controlled to release the fixation of the states of the signals to be output to the plural signal lines by the operation control unit, after the supply of the reference voltage by the reference voltage supply unit is restarted.

14. The control method according to claim 10, wherein the specific signal state is a state in which the operation control unit outputs a low level signal of which a voltage value is lower than the reference voltage of the plural signal lines.

15. The control method according to claim 10, wherein the reference voltage supply unit supplies the reference voltage to the plural signal lines through a terminal resistor of the data storage apparatus.

16. The control method according to claim 10, wherein
the data storage unit is a DRAM which performs a refresh operation for holding the data, and
the data storage apparatus comprises a transmission unit configured to transmit a signal for causing the DRAM to perform the refresh operation through the bus.

17. The control method according to claim 16, wherein the DRAM performs the refresh operation in either one of a first refresh mode of performing the refresh operation based on the signal input through the bus and for causing to perform the refresh operation and a second refresh mode of performing the refresh operation without using the signal for causing to perform the refresh operation.

18. The control method according to claim 10, further comprising controlling, in a case where it is judged that the condition of transitioning the data storage apparatus into the power saving state is established, to interrupt a clock signal supplied to the data storage unit through a clock supply signal line.

* * * * *